United States Patent [19]

Nelson et al.

[11] Patent Number: 5,413,871
[45] Date of Patent: May 9, 1995

[54] THERMAL BARRIER COATING SYSTEM FOR TITANIUM ALUMINIDES

[75] Inventors: Warren A. Nelson, Cincinnati; Jon C. Schaeffer, Milford; Srinivasan Raghuraman, West Chester, all of Ohio

[73] Assignee: General Electric Company, Cincinnati, Ohio

[21] Appl. No.: 22,211

[22] Filed: Feb. 25, 1993

[51] Int. Cl.[6] ............................................. B22F 7/00
[52] U.S. Cl. ...................................... 428/552; 428/564; 419/19; 501/132; 501/152
[58] Field of Search ............... 428/552, 564; 419/19; 501/134, 152

[56] References Cited

U.S. PATENT DOCUMENTS

| | | | |
|---|---|---|---|
| 4,710,348 | 12/1987 | Brupbacher et al. | 420/129 |
| 4,847,044 | 7/1989 | Ghosh | 419/19 X |
| 4,851,188 | 7/1989 | Schaefer et al. | 419/19 X |
| 4,885,214 | 12/1989 | Trenkler et al. | 428/614 |
| 4,897,315 | 1/1990 | Gupta | 428/552 |
| 4,966,816 | 10/1990 | Wardlaw et al. | 428/552 |
| 4,980,239 | 12/1990 | Harada et al. | 428/552 |
| 5,057,379 | 10/1991 | Fayeulle et al. | 428/552 |
| 5,079,100 | 1/1992 | Descamp et al. | 428/552 |

Primary Examiner—Peter A. Nelson
Attorney, Agent, or Firm—Jerome C. Squillaro

[57] ABSTRACT

An article of manufacture has as its basic structure a piece of a titanium aluminide, such as gamma (TiAl) or alpha-2 (Ti3Al), desirably in the shape of an aircraft gas turbine component. A thermal barrier coating system overlies at least a portion of the surface of the piece of titanium aluminide. The thermal barrier coating system includes a metallic bond coat layer, preferably in the form of a layer of a nickel-based alloy no more than about 0.005 inches thick, that contacts the piece of titanium aluminide, and a ceramic thermal barrier coating layer, preferably a stabilized zirconia such as yttria-stabilized zirconia, overlying the bond coat.

17 Claims, 1 Drawing Sheet

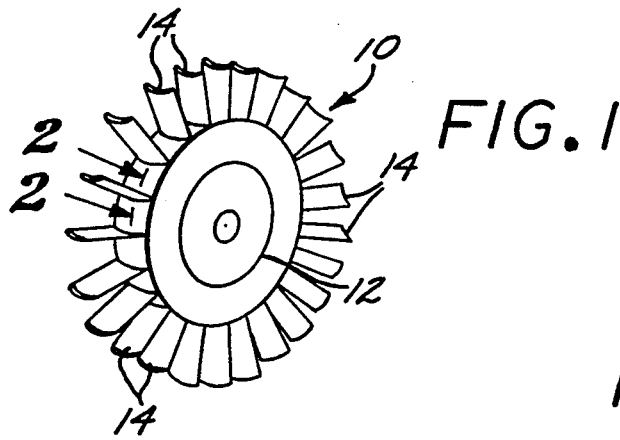
FIG. 1
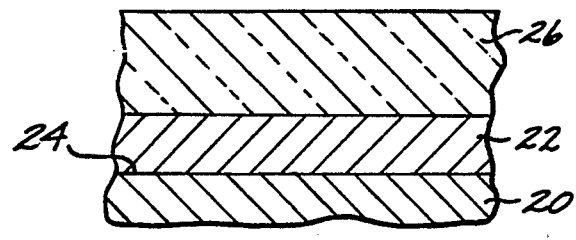
FIG. 2
FIG. 3
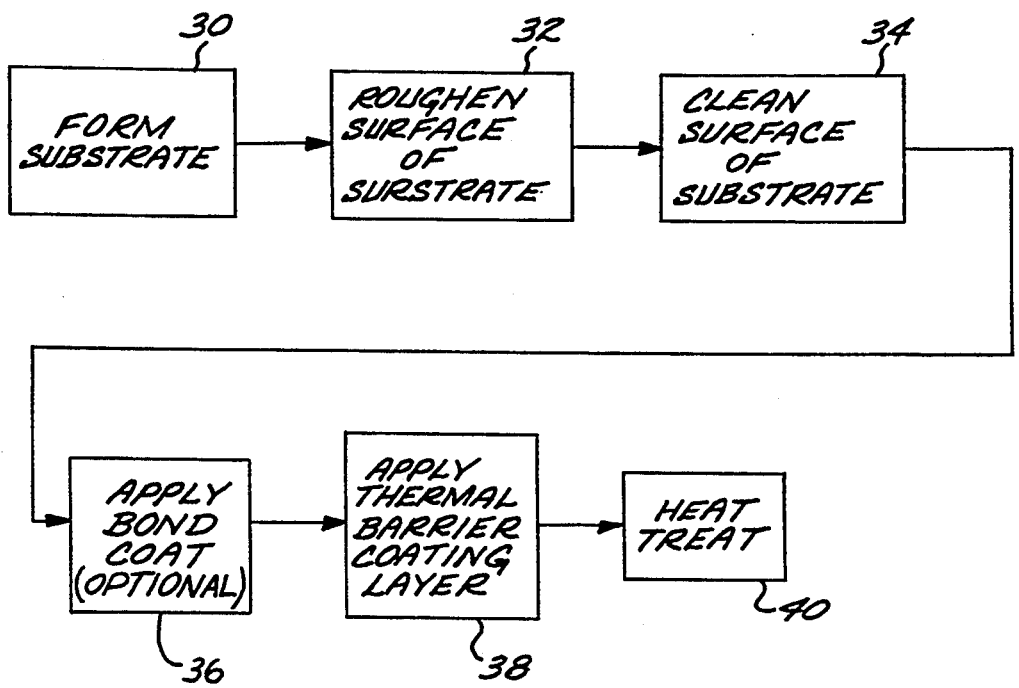

THERMAL BARRIER COATING SYSTEM FOR TITANIUM ALUMINIDES

BACKGROUND OF THE INVENTION

This invention relates to the use of titanium aluminide materials, and, more particularly, to the protection of such materials against high temperature, oxidative environments.

Titanium aluminides are a class of intermetallic compounds based upon alloys of titanium, aluminum, and other elements. Two titanium aluminides of particular interest are gamma titanium aluminide and alpha-2 titanium aluminide. These materials a re of relatively low density as compared to nickel-based alloys, being based upon the light element s titanium and aluminum, and of excellent specific modulus and strength at intermediate temperatures.

The titanium aluminides have properties intermediate those of metals and ceramics. They exhibit good elevated temperature properties characteristic of ceramics, but also have some degree of ductility characteristic of metals. This ductility is important in most engineering applications, inasmuch as the ductility can impart fracture toughness, resistance to crack propagation, and resistance to thermal shock. The titanium aluminides also have coefficients of thermal expansion that are relatively low as compared with most metallic structural materials, which also contributes to reduced susceptibility to thermal shock damage.

Titanium aluminides are candidates for use in aircraft gas turbine jet engines, in such parts as exhaust structures, high pressure compressor blades and disks, inlet guide vanes, combustor cases, and possibly low pressure turbine blades. In these applications, the titanium aluminides would be subject to intermediate temperatures, and simultaneously to environmental attack in the form of oxidation, hot corrosion, hot salt stress corrosion cracking, and interstitial embrittlement. Titanium is a moderately reactive metal, and the titanium aluminides tend to be susceptible to environmental damage.

Although the titanium aluminides offer excellent potential for use in moderate-temperature structural applications, there is a need for an approach to protecting these materials against thermally and environmentally induced damage. The present invention aids in overcoming such shortcomings.

SUMMARY OF THE INVENTION

This invention provides a thermal barrier coating ("TBC") system for titanium aluminides. The thermal barrier coating system permits the maximum use temperature of the titanium aluminide to be increased above what would be ordinarily possible, as, for example, from an unprotected 1200 F to about 1400 F when the TBC system is used. The TBC system is strongly adherent to the titanium aluminide substrate materials and aids in resisting thermally and environmentally induced damage. The TBC system of the invention can be applied to a titanium aluminide substrate using application techniques and apparatus commercially available for use in other contexts, in an economical fashion that is suitable for both small-scale and large-scale application. The approach of the invention is also compatible with various improvements to the basic thermal barrier coating system.

In accordance with the invention, an article of manufacture comprises a piece of a titanium aluminide having a thermal barrier coating system overlying at least a portion of the surface of the piece of titanium aluminide. The thermal barrier coating system comprises a metallic bond coat layer contacting the piece of titanium aluminide, and a ceramic thermal barrier coating layer overlying the bond coat. The metallic bond coat layer is preferably a nickel-based alloy having a thickness of no more than about 0.005 inches. The thermal barrier coating layer is preferably a ceramic such as zirconia, and most preferably yttria-stabilized zirconia, having a thickness of from about 0.003 to about 0.050 inches.

The ceramic thermal barrier coating layer provides a degree of thermal insulation to the titanium aluminide, and also protects it from erosion damage. The bond coat between the ceramic thermal barrier coating layer and the titanium aluminide substrate serves as a diffusion barrier against oxidation and corrosion of the titanium aluminide, and also against the introduction of interstitially diffusing species, such as carbon, hydrogen, nitrogen, and oxygen into the titanium aluminide from the environment. The interstitially diffusing species can embrittle the titanium aluminide, leading to surface and bulk cracking of the article. The bond coat, being relatively ductile, remains adherent to the titanium aluminide substrate and prevents introduction of these harmful species during service.

The thermal barrier coating system of the invention can be applied to the titanium aluminide substrate by any convenient technique suitable for applying the bond coat and the ceramic thermal barrier coating layer. Preferably, the bond coat is applied by air plasma or high velocity oxy-fuel spraying. The ceramic layer is preferably applied by air plasma spraying.

It has been known to provide thermal barrier coating systems having a bond coat and a ceramic layer to protect other metallic substrates. In particular, such an approach has been used with nickel-based alloy substrates. In that case, however, the rationale for using a bond coat between the ceramic overcoat and the substrate is entirely different than in the present system. A nickel-based alloy substrate can oxidize, but does not dissolve interstitially diffusing species to the same extent as do the titanium aluminides. There is no need for a barrier to introduction of interstitially diffusing species on nickel-based alloy substrates. Instead, the bond coat is present primarily to aid in maintaining adherence of the ceramic top layer to the substrate and to prevent conventional oxidation of the substrate. There is a large difference in thermal expansion coefficient between typical ceramic overcoats and nickel-based alloy substrates, and the metallic bond coat acts as an environmentally resistant buffer to absorb strains and prevent spalling of the ceramic layer. This function is not needed for the case of the titanium aluminides, because their thermal expansion coefficients are relatively close to those of the ceramic overcoat materials. Thus, there is no reason to use a bond coat for TBC systems applied to titanium aluminides, based upon the experience with the use of thermal barrier coatings on nickel-based superalloys.

The present invention provides an important advance in the use of titanium aluminides for structural applications. It permits the titanium aluminide to be used in intermediate-temperature applications wherein the environment is aggressive. Other features of the invention will be apparent from the following detailed description of the preferred embodiments.

BRIEF DESCRIPTION OF THE DRAWINGS

FIG. 1 is a perspective view of a component of an aircraft gas turbine engine made according to the approach of the invention;

FIG. 2 is an enlarged sectional view of the component of FIG. 1, taken along lines 2—2; and FIG. 3 is a process flow diagram for the preparation of an article according to the invention.

DETAILED DESCRIPTION OF THE INVENTION

FIG. 1 illustrates an article 10 that is a component of an aircraft gas turbine engine, in this case a compressor disk 12 having a compressor blade 14 attached thereto. Either or both of the compressor disk 12 and the compressor blade 14 may have a structure in accordance with the invention. Some examples of other articles that may be made with the same approach using protected titanium aluminides are exhaust structures, low pressure turbine blades, inlet guide vanes, and combustors. This list is presented by way of example, and is not intended to be exhaustive.

In accordance with a preferred embodiment of the invention, an article of manufacture comprises a piece of a titanium aluminide, the titanium aluminide being selected from the group consisting of gamma titanium aluminide and alpha-2 titanium aluminide, and a thermal barrier coating system overlying at least a portion of the surface of the piece of titanium aluminide. The thermal barrier coating system comprises a metallic bond coat layer no more than about 0.005 inches thick contacting the piece of titanium aluminide, the bond coat layer being made from a nickel-based alloy, and a zirconia-based thermal barrier coating layer overlying the bond coat. The bond coat layer and the thermal barrier coating layer are collectively termed the thermal barrier coating (TBC) system.

FIG. 2 depicts a sectional view through one of the articles 10 having the present structure. The article 10 includes a substrate 20 made of a titanium aluminide. The substrate 20 has the basic shape of the article or structure of interest, inasmuch as the layers of the thermal barrier coating system usually have a small total thickness. The present approach is intended to provide a protective coating on a structure that is made to essentially its final configuration, not build up structure from a substantially undersize state to a final state. However, the substrate may be made slightly undersize to accommodate the added dimensions of the thermal barrier coating system, on the order of thousandths of an inch in each direction.

The most preferred titanium aluminides used in the substrate 20 are gamma titanium aluminide and alpha-2 titanium aluminide. As used herein, a "gamma titanium aluminide" is the composition TiAl or a composition based upon TiAl. As used herein, an alpha-2 titanium aluminide is the composition Ti3Al or a composition based upon Ti3Al. The term "based upon" as used herein means that the titanium aluminide is an alloyed version of the indicated composition having the same crystal structure. For example, limited amounts of elements such as niobium, molybdenum, chromium, tantalum, and boron may be added to titanium aluminides to modify their physical and mechanical properties, without changing their crystal structures in each case. The added elements may be added to the bulk of the titanium aluminide, according to principles known to those skilled in using such alloys, or may be diffused into the structure from adjacent regions or layers during heat treatments and/or service conditions.

A metallic bond coat layer 22 is deposited on a surface 24 of the substrate 20. The bond coat layer 22 has a relatively small thickness, preferably no more than about 0.003 inches. The thickness is maintained at such small values to avoid substantial increases in interfacial stresses between the bond coat layer 22 and the substrate 20, and to minimize the added weight due to the bond coat layer.

The bond coat layer 22 is a metallic alloy, preferably a nickel-based alloy. Examples of operable nickel-based alloys for this purpose are NC6', having a nominal composition in weight percent of 10 percent cobalt, 18 percent chromium, 6.5 percent aluminum, 6 percent tantalum, 2 percent rhenium, 0.5 percent hafnium, 1 percent silicon, 0.3 percent yttrium, balance nickel; Inconel 718, having a nominal composition in weight percent of 19 percent chromium, 0.5 percent aluminum, 0.9 percent titanium, 3 percent molybdenum, 18.5 percent iron, 5.1 percent niobium plus tantalum, balance nickel; Rene 80, having a nominal composition in weight percent of 9.5 percent cobalt, 14 percent chromium, 3 percent aluminum, 5 percent titanium, 4 percent tungsten, 4 percent molybdenum, 0.75 percent hafnium, balance nickel; and NiCrAlY, having a nominal composition in weight percent of 22 percent chromium, 10 percent aluminum, 0.5 percent yttrium, balance nickel. The material of the bond coat layer 22 is selected to be more ductile than the substrate at operating temperatures of the component and to resist cracking. The material of the bond coat layer 22 also produces a protective alumina-based surface scale or chromia-based surface scale. The surface scale aids in resisting diffusion of oxygen and other elements from the environment into the titanium aluminide substrate.

In addition, the bond coat layer 22 prevents diffusion of other species such as carbon, nitrogen, hydrogen, and oxygen from the environment into the titanium aluminide substrate 20. Such species can diffuse rapidly by interstitial diffusion in the titanium aluminide, but diffuse only very slowly in nickel-based alloys and their oxides. Such species are known to embrittle titanium aluminides and lead to premature cracking of the titanium aluminides. Their presence in the titanium aluminide substrate is therefore highly deleterious and desirably avoided. The bond coat layer 22 therefore functions as an adherent diffusion barrier to the introduction into the substrate 20 of such species that diffuse interstitially in the titanium aluminide. The bond coat layer 22 is selected to be more ductile than the substrate 20 in order to resist cracking during service, because even a small crack could serve as the entry point for such undesirable interstitially diffusion species. (The thermal barrier coating layer, to be discussed next, is made of a relatively low ductility ceramic material, and therefore cannot be relied upon for the diffusion barrier function at high service temperatures.)

Overlying the bond coat layer 22 is a somewhat porous ceramic thermal barrier coating layer 26, also sometimes termed a "top coat". The thermal barrier coating layer 26 acts in the manner of conventional insulation to produce a thermal gradient between the external service environment and the surface 24 of the substrate 20, so that the substrate 20 may be operated at a temperature greater than would otherwise be possible.

The thermal barrier coating layer 26 also resists erosion and other physical damage at elevated temperature.

The thermal barrier coating layer 26 should be maintained as thin as possible to avoid the build-up of interfacial stresses between the thermal barrier coating layer 26 and the bond coat layer 22, but must be of sufficient thickness to perform its insulative function. The preferred thickness of the thermal barrier coating layer 25 is from about 0.003 to about 0.050 inches. The thermal barrier coating layer 26 is formed of a ceramic, preferably zirconium oxide (zirconia) that is partially stabilized by the addition of about 8 weight percent of yttrium oxide (yttria). Other zirconia stabilizers include calcium oxide, magnesium oxide, and cerium oxide.

Further in accordance with the invention, a process for preparing an article of manufacture comprises the steps of providing a piece of a titanium aluminide, and applying a thermal barrier coating system overlying at least a portion of the surface of the piece of titanium aluminide. The step of applying includes the substeps of depositing a metallic bond coat layer contacting the piece of titanium aluminide, and depositing a ceramic thermal barrier coating layer overlying the bond coat.

The preferred approach for preparing the article of the invention is illustrated in block diagram form in FIG. 9. The substrate 20 is first prepared in essentially its final shape and form, numeral 30, except that it may be prepared slightly undersize to account for the added thickness of the thermal barrier coating system 22 and 26. The substrate 20 may be processed to this shape and form by any technique known to those skilled in working with titanium aluminides.

The surface 24 of the titanium aluminide substrate 20 to which the bond coat 22 is to be applied is preferably roughened, numeral 32, as by grit blasting or vapor honing, to improve the bonding of the bond coat layer 22 to the substrate 20. The roughened surface is next cleaned, numeral 34, with conventional solvents and/or an alkaline solution to remove any residue that may be present.

The bond coat layer 22 is applied by any suitable process, numeral 96. A large number of techniques are known for applying a metallic coating to a surface, and any of these techniques is operable. The preferred approach is air plasma spraying, which produces a generally rough upper surface on the bond coat layer 22 suitable for bonding of the thermal barrier coating layer 26 to the bond coat. Air plasma spraying is a well known and widely used technique that is effective and also economical for application for large areas of bond coat.

The thermal barrier coating layer 25 is applied by any suitable process, numeral 38. The preferred approach is air plasma spraying.

Optionally, the finished structure is heat treated, numeral 40, to consolidate sprayed layers, improve the adhesion of the bond coat layer 22 to the substrate 20, and improve the adhesion of the thermal barrier coating layer 26 to the bond coat layer 22, by interdiffusion of the layers. An operable heat treatment is 1200 F for about 4 hours.

The approach of the invention as just described (with the optional heat treatment) has been practiced to produce a coated alpha-2 titanium aluminide test piece. The test piece was cycled between ambient temperature and 1400 F through 710 cycles. The TBC coating system remained adherent and protective of the surface of the titanium aluminide substrate.

The present invention therefore provides an important advance in the art of the practical use of titanium aluminides. It will be understood that various changes and modifications not specifically referred to herein may be made in the invention herein described, and to its uses herein described, without departing from the spirit of the invention particularly as defined in the following claims.

What is desired to be secured by Letters Patent follows.

What is claimed is:

1. An article of manufacture, comprising:
   a piece of a titanium aluminide; and
   a thermal barrier coating system overlying at least a portion of the surface of the piece of titanium aluminide, the thermal barrier coating system comprising
      a metallic bond coat layer contacting the piece of titanium aluminide, and
      a ceramic thermal barrier coating layer overlying the bond coat.

2. The article of claim 1, wherein the titanium aluminide is gamma titanium aluminide.

3. The article of claim 1, wherein the titanium aluminide is alpha-2 titanium aluminide.

4. The article of claim 1, wherein the bond coat layer is less than about 0.005 inches thick.

5. The article of claim 1, wherein the bond coat is a nickel-based alloy.

6. The article of claim 1, wherein the thermal barrier coating layer includes zirconia.

7. The article of claim 1, wherein the barrier layer is yttria-stabilized zirconia.

8. The article of claim 1, wherein the article is a piece of an jet engine.

9. The article of claim 1, wherein the thermal barrier coating layer is no more than about 0.050 inches thick.

10. An article of manufacture, comprising:
    a piece of a titanium aluminide, the titanium aluminide being selected from the group consisting of gamma titanium aluminide and alpha-2 titanium aluminide; and
    a thermal barrier coating system overlying at least a portion of the surface of the piece of titanium aluminide, the thermal barrier coating system comprising
       a metallic bond coat layer no more than about 0.005 inches thick contacting the piece of titanium aluminide, the bond coat layer being made from a nickel-based alloy, and
       a zirconia-based thermal barrier coating layer overlying the bond coat.

11. The article of claim 10, wherein the titanium aluminide is gamma titanium aluminide.

12. The article of claim 10, wherein the titanium aluminide is alpha-2 titanium aluminide.

13. The article of claim 10, wherein the article is a piece of an jet engine.

14. The article of claim 10, wherein the thermal barrier coating layer is no more than about 0.050 inches thick.

15. A process for preparing an article of manufacture, comprising the steps of:
    providing a piece of a titanium aluminide; and
    applying a thermal barrier coating system overlying at least a portion of the surface of the piece of titanium aluminide, the step of applying including the substeps of depositing a metallic bond coat layer contacting the piece of titanium aluminide, and depositing a ceramic thermal barrier coating layer overlying the bond coat.

16. The process of claim 15, wherein the step of depositing a metallic bond coat is accomplished by a plasma spray process.

17. The process of claim 15, wherein the step of depositing a ceramic thermal barrier coating layer is accomplished by a plasma spray process.

* * * * *